United States Patent [19]

Hart

[11] 4,175,792
[45] Nov. 27, 1979

[54] CONTINUAL QUICK SERVICE VALVE DEVICE

[75] Inventor: James E. Hart, Trafford, Pa.

[73] Assignee: Westinghouse Air Brake Company, Wilmerding, Pa.

[21] Appl. No.: 942,234

[22] Filed: Sep. 14, 1978

Related U.S. Application Data

[62] Division of Ser. No. 779,672, Mar. 21, 1977.

[51] Int. Cl.² .............................................. B60T 15/44
[52] U.S. Cl. ...................................... 303/37; 303/38; 303/82
[58] Field of Search ................................... 303/36–38, 303/69, 81–83, 86

[56] References Cited

U.S. PATENT DOCUMENTS

| | | | |
|---|---|---|---|
| 1,487,692 | 3/1924 | Thomas | 303/37 |
| 1,842,481 | 1/1932 | Thomas | 303/82 |

Primary Examiner—Stephen G. Kunin
Attorney, Agent, or Firm—R. W. McIntire, Jr.

[57] ABSTRACT

This invention relates to a railway vehicle continual quick service valve device that embodies two abutments normally subject on their respective opposite sides of the pressure in a train brake pipe and in a control chamber. Upon a reduction of brake pipe pressure on one side of these abutments, one abutment operates a valve to release fluid under pressure from the brake pipe and the brake pipe side of the other abutment to atmosphere whereupon this other abutment operates a valve that releases fluid under pressure from the control chamber and the control chamber side of both abutments to atmosphere. These abutments then operate their respective valves to cut off venting of fluid under pressure from the brake pipe and the control chamber to atmosphere. If the reduction of brake pipe pressure on the one side of the one abutment continues, the abovedescribed cycle reoccurs so long as fluid under pressure is released from the brake pipe.

5 Claims, 3 Drawing Figures

CONTINUAL QUICK SERVICE VALVE DEVICE

This is a division of application Ser. No. 779,672, filed Mar. 21, 1977.

BACKGROUND OF THE INVENTION

In the copending patent application, Ser. No. 740,837, now U.S. Pat. No. 4,043,604 of James E. Hart, filed Nov. 11, 1976, and assigned to the assignee of the present application, there is shown and described a novel emergency portion for a railway vehicle brake control valve device wherein, upon effecting a service brake application, fluid under pressure is vented from a quick action chamber into the train brake pipe.

Moreover, in U.S. Pat. No. 3,716,276, issued Feb. 13, 1973 to Richard L. Wilson et al, and assigned to the assignee of the present application, there is shown and described a brake control valve device that is substantially the same in function and operation as the latest design of brake control valve devices now being offered to the railway industry as the brake control valve device included in the standard fluid pressure brake apparatus installed on any new freight cars built subsequent to Jan. 1, 1977. In this brake control valve device, the fluid under pressure released from the quick action chamber, when effecting a service brake application, is used to operate a continual quick service valve device that effects a "quick service" transmission through a train brake pipe of a pressure reduction wave.

It is obvious that when fluid under pressure is vented from the quick action chamber into the brake pipe upon effecting a service brake application, as is in the case in the brake control valve device shown and described in the above-mentioned copending patent application, Ser. No. 740,837, now U.S. Pat. No. 4,043,604 the fluid under pressure thus vented from the quick action chamber into the brake pipe cannot be used to operate a continual quick service valve device to effect a "quick service" transmission through a train brake pipe of a pressure reduction wave.

Accordingly, it is the general purpose of this invention to provide a novel continual quick service valve device for use in combination with a brake control valve device of the type in which fluid under pressure is vented from a quick action chamber into the train brake pipe when effecting a service brake application.

SUMMARY OF THE INVENTION

According to the present invention, a novel continual quick service valve device is provided which embodies therein a control volume that is charged via a choke to the same pressure as is carried in the train brake pipe, two abutments that are so subject on their respective opposite sides to the pressure in this control volume and the train brake pipe as to operate, in reoccurring cycles so long as a service rate of reduction of pressure in a train brake pipe continues, a pair of valves, one of which releases fluid under pressure from the brake pipe and the brake pipe side of one of the abutments whereupon this one abutment is thereby rendered effective to operate the other one of the pair of valves to release fluid under pressure from the control volume and the control volume side of both abutments to atmosphere until the pressure therein is reduced below that in the brake pipe. The two abutments, in response to this reduction of pressure in the control volume, are then operated by the higher brake pipe pressure to reseat the pair of valves whereupon the above-described cycle is repeated in response to a continuing release of fluid under pressure from the brake pipe by a brake valve device on a locomotive.

DESCRIPTION—FIG. 1

Figure 1:
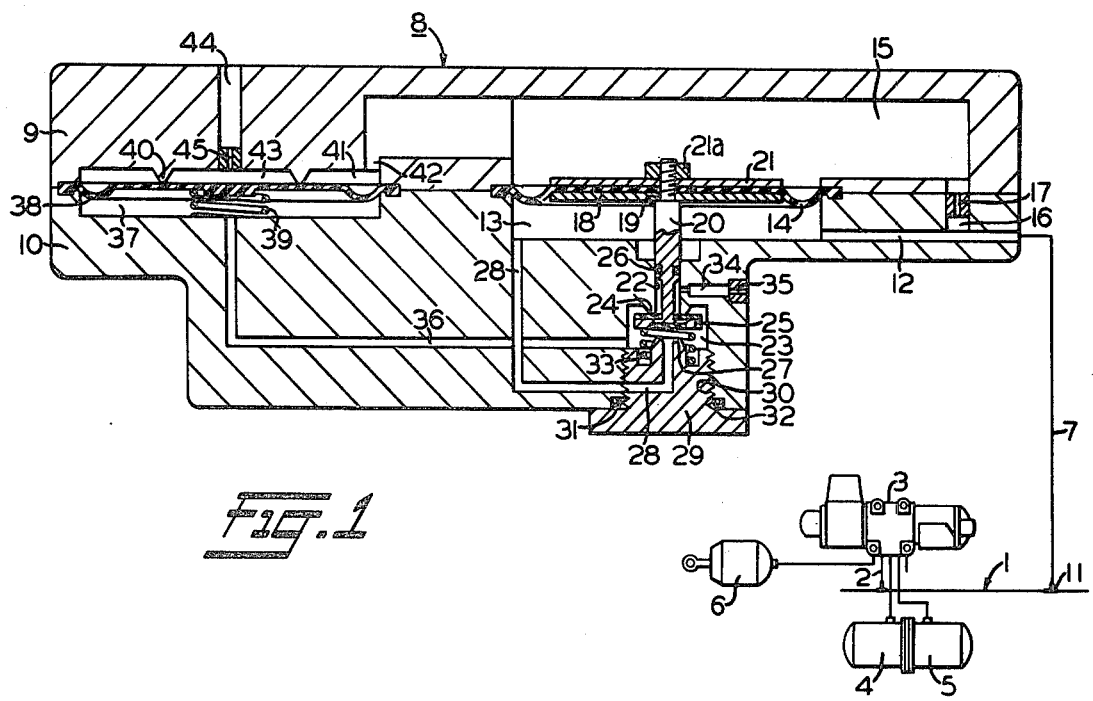
FIG. 1 is a diagrammatic view, partly in section, showing a railway freight car brake control apparatus that comprises a continual quick service valve device constructed in accordance with a first embodiment of the invention.

As shown in FIG. 1 of the drawings, the fluid pressure brake apparatus constituting the present invention comprises a brake pipe 1, a first branch pipe 2, a brake control valve device 3, an auxiliary reservoir 4, an emergency reservoir 5, a brake cylinder 6, a second branch pipe 7, and a continual quick service valve device 8.

The brake control valve device 3 may be of the type disclosed in the above-mentioned copending patent application, Ser. No. 740,837, now U.S. Pat. No. 4,043,604, wherein, upon effecting a service brake application, fluid under pressure is vented from a quick action chamber into the train brake pipe and, therefore, is not available for operating a continual quick service valve device of the type disclosed in the above-mentioned U.S. Pat. No. 3,716,276.

In view of the above-mentioned copending patent application, Ser. No. 740,837, now U.S. Pat. No. 4,043,604, it is deemed unnecessary to show and describe in detail the brake control valve device 3 and the brake cylinder 6. It will, of course, be understood that the brake control valve device 3 operates upon a service rate of reduction of pressure in a train brake pipe to effect the supply of fluid under pressure from the auxiliary reservoir 4 to the brake cylinder 6 to cause a service brake application, upon an emergency rate of reduction of pressure in the train brake pipe to effect the supply of fluid under pressure from both the auxiliary reservoir 4 and the emergency reservoir 5 to the brake cylinder 6 to cause an emergency brake application, and upon an increase in the pressure of the fluid in the train brake pipe, subsequent to a brake application, to effect a full release of the brakes and the charging of the auxiliary reservoir 4 and the emergency reservoir 5 to the normal fully charged pressure carried in the train brake pipe. It will also be understood that the brake cylinder 6 is effective to apply to the wheels of a railway vehicle a braking force proportional to the pressure of the fluid supplied to this brake cylinder by the brake control valve device 3.

The continual quick service valve device 8 comprises a pair of casing sections 9 and 10 that are secured together by any suitable means (not shown). Secured to the casing section 10 is one end of the second branch pipe 7, the opposite end being connected to the side outlet of pipe tee 11 disposed in the brake pipe 1.

Formed in the casing section 10 is a passageway 12 to one end of which is secured the one end of the branch pipe 7. The other end of this passageway 12 opens into a chamber 13 formed by the cooperative relationship between the casing section 10 and an annular flexible diaphragm 14, the outer periphery of which is clamped between the casing sections 9 and 10. This diaphragm 14 cooperates with the casing sections 9 and 10 to form on its upper side a control volume or chamber 15 and on its lower side of the above-mentioned chamber 13. The control chamber 15 is charged with fluid under pressure from the brake pipe 1 via the second branch passageway 7, passageway 12, a short passageway 16 and a charging choke 17 disposed in this passageway 16.

The inner periphery of the annular diaphragm 14 is clamped between a diaphragm follower 18 that rests against a shoulder 19 formed on a valve operating stem 20 and a diaphragm follower plate 21 by a nut 21a that has screw-threaded engagement with screw threads provided therefor adjacent the upper end of the stem 20.

As shown in FIG. 1 of the drawings, the valve operating stem 20 extends through a bore 22 in the casing section 10 into a chamber 23, there being an annular valve seat 24 formed on the casing section 10 at the lower end of the bore 22. Disposed in the chamber 23 is a disc valve 25 that is formed integral with the lower end of the valve operating stem 20, it being noted from FIG. 1 that this lower end of the stem 20 is fluted and that intermediate its ends this stem is provided with a peripheral annular groove in which is disposed an O-ring seal 26 that forms a seal with the wall surface of the bore 22 to prevent leakage of fluid under pressure between chambers 13 and 23.

The disc valve 25 is provided on its upper and lower sides with some resilient material, such as, for example, rubber, which is bonded thereto, to form seating surfaces for engagement with the valve seat 24 and an annular valve seat 27 formed at one end of a passageway 28 that extends through a screw-threaded plug 29 and the casing section 10 and at its other end opens into the chamber 13. This screw-threaded plug 29 has screw-threaded engagement with a screw-threaded bore 30 provided therefor in the casing section 10. An O-ring seal 31 that is disposed in a counterbore 32 that is coaxial with the bore 30 prevents leakage of fluid under pressure from the passageway 28 to atmosphere.

A spring 33 is disposed in the chamber 23 and interposed between the plug 29 and the lower side of the disc valve 25 to normally bias the upper seating surface on this disc valve into seating contact with the valve seat 24 thereby closing communication between the chamber 23 and atmosphere via the bore 22, a passageway 34 provided in the casing section 10 and an exhaust choke 35 disposed in the outer end of this passageway 34.

Opening into the chamber 23 is one end of a passageway 36 that extends through the casing section 10 and at its other end opens into a chamber 37 that is formed by the cooperative relationship between the casing section 10 and a diaphragm valve 38, the outer periphery of which is clamped between the casing sections 9 and 10.

A spring 39 disposed in the chamber 37 and interposed between the casing section 10 and the lower side of the diaphragm valve 38 is normally effective to bias the upper side of this diaphragm valve against an annular valve seat 40 formed on the lower side of the casing section 9.

As shown in FIG. 1, while the diaphragm valve 38 is biased against the valve seat 40 by the spring 39, the upper side of this diaphragm valve 38 outside of the annular valve seat 40 cooperates with the casing section 9 to form a chamber 41 that is connected to the chamber 15 by a short passageway 42 provided in the casing section 9. Consequently, the chamber 41 is charged to the same pressure as is present in the control chamber 15.

The upper side of the diaphragm valve 38 within the annular valve seat 40 cooperates with the casing section 9 to form an annular chamber 43 that is open to atmosphere via a passageway 44 extending through the casing section 9 and having disposed therein adjacent the end that opens into the annular chamber 43 an exhaust choke 45.

OPERATION—FIG. 1 Initial Charging

Let is be assumed that a railway freight car provided with the brake control valve device 3 and the continual quick service valve device 8 has been coupled into a train of cars, and that a handle of an engineer's brake valve device (not shown) located on the locomotive that is coupled to the head end of the train is in its release position. Therefore, while the handle of the engineer's brake valve device is in its release position, the engineer's brake valve device will effect the supply of fluid under pressure to the train brake pipe and, therefore, to the brake pipe 1 to charge the brake pipe 1 to a preselected normal charged value which, for example, may be seventy pounds per square inch.

Fluid under pressure supplied to the brake pipe 1 will cause the brake control valve device 3 to operate in the manner explained in the above-mentioned copending patent application Ser. No. 740,837, now U.S. Pat. No. 4,043,604, to effect a release of the brakes on the car and charging of the auxiliary reservoir 4 and the emergency reservoir 5.

Fluid under pressure supplied to the brake pipe 1 will flow therefrom to: (1) the chamber 13 via the second branch pipe 7 and passageway 12, (2) the chamber 23 from the chamber 13 via the passageway 28, and (3) the chamber 37 from the chamber 23 via the passageway 36.

The fluid under pressure supplied to the passageway 12 flows through the short passageway 16 and charging choke 17 to the control chamber 15 which is connected to the chamber 41 by the passageway 42 to charge these chambers 15 and 41 to the fully charged pressure normally carried in the train brake pipe.

With the chambers 13, 15, 37 and 41 all charged to the pressure normally carried in the train brake pipe, which may be, for example, seventy pounds per square inch, the spring 33 is effective to maintain the resilient seating surface on the upper side of the disc valve 25 seated on the seat 24, and the spring 39 is effective to maintain the diaphragm valve 38 seated on the valve seat 40. Therefore, the chamber 43 is open to atmosphere via the choke 45 and passageway 44.

SERVICE BRAKE APPLICATION

To manually effect a service brake application on all the cars in the train, the engineer will move the handle of the brake valve device on the locomotive arcuately from it; release position into its service application zone to a position corresponding to the degree of service brake application desired. When the handle of the engineer's brake valve device is moved into the service application zone, the brake valve device operates to vent fluid under pressure from the brake pipe 1 to atmosphere until the pressure in the brake pipe 1 is reduced to a corresponding degree.

As the pressure in the brake pipe 1 is reduced, the brake control valve device 3 operates in the manner described in the above-mentioned copending application Ser. No. 740,837, now U.S. Pat. No. 4,043,604, to effect an initial quick service reduction in brake pipe pressure by venting fluid under pressure from the brake pipe into the quick service volume 21 (in the copending application Ser. No. 740,837, now U.S. Pat. No. 4,043,604) and a service brake application on the freight car on which the brake control valve device 3 is installed. The degree of the service brake application corresponding to the degree of reduction of pressure effected in the brake pipe 1. The brake control valve device 3 then moves to a lap position.

Also, as the pressure in the brake pipe 1 is reduced by flow therefrom to atmosphere via the engineer's brake valve device on the locomotive, fluid under pressure will flow at an unrestricted rate from the chambers 37 and 13 below the diaphragm valve 38 and diaphragm 14 respectively to the brake pipe 1, via passageway 36, chamber 23, passageways 28 and 12 and second branch pipe 7.

The choke 17 restricts the rate of flow of fluid under pressure from the control chamber 15 to the passageway 16 and thence to the brake pipe 1 via passageway 12 and second branch pipe 7.

Accordingly, a differential of pressure is quickly developed on the opposite sides of the diaphragm 14 which acts in a downward direction to shift the valve operating stem 20 and disc valve 25 downward against the yielding resistance of spring 33 so that the upper seating surface on this valve 25 is unseated from the valve seat 24.

As soon as the upper seating surface on the valve 25 is unseated from the valve seat 24, and before this valve 25 can be shifted downward far enough for the lower seating surface thereon to engage the valve seat 27, fluid under pressure will be locally released from the brake pipe 1 to atmosphere via second branch pipe 7, passageway 12, chamber 13, passageway 28, chamber 23, past valve seat 24, bore 22, passageway 34 and exhaust choke 35 at a rate determined by the diameter of this choke 35.

This local venting of fluid under pressure from the brake pipe 1 to atmosphere via the choke 35 effects a further reduction of the pressure of the fluid in the chamber 13 below the diaphragm 14 which increases the differential fluid pressure force acting downward on this diaphragm 14.

Therefore, this increase in the differential fluid pressure force acting downward on the diaphragm 14 is effective to shift the disc valve 25 downward and further away from the valve seat 24. Thus, the opening through which fluid under pressure can flow into the bore 22 and thence to atmosphere via passageway 34 and choke 35 is increased.

It may be noted that the total volume of the train brake pipe of which the volume of the brake pipe 1 extending from end to end of the car is a portion is considerably greater than the volume of the chamber 37 and the passageway 36.

Furthermore, the fluid under pressure present in the chamber 37 acts on the entire area of the lower side of the diaphragm valve 38 whereas the fluid under pressure present in the chamber 41 acts on an area that is smaller by an amount equal to the area within the annular valve seat 40.

Therefore, as fluid under pressure flows from the train brake pipe to atmosphere through the opening provided between the valve seat 24 and the upper seating surface on the disc valve 25, the bore 22, passageway 34 and choke 35, there will not be a sufficient reduction of the pressure in the chamber 37 for the fluid under pressure in the chamber 41 to unseat the diaphragm valve 38 from the annular valve seat 40 against the yielding resistance of the spring 39 until the differential of pressure acting downward on the diaphragm 14 is increased sufficiently for this diaphragm 14 to shift the valve operating stem 20 and disc valve 25 downward until the lower seating surface on this valve 25 is seated on the valve seat 27 which cuts off further flow of fluid under pressure from the train brake pipe to atmosphere via the exhaust choke 35.

Subsequent to movement of the lower seating surface on the disc valve 25 into seating engagement with the valve seat 27 and thereby the cut-off of flow of fluid under pressure from the train brake pipe to atmosphere via the exhaust choke 35, the fluid under pressure present in the chamber 37 will flow to atmosphere via passageway 36, chamber 23, past valve seat 24, bore 22, passageway 34 and exhaust choke 35.

Upon the release of fluid under pressure from the chamber 37 to atmosphere in the manner just explained, the fluid under pressure present in the chamber 41, which is connected to the volume chamber 15 by the short passageway 42, will deflect the diaphragm valve 38 downward to unseat the upper side thereof from the annular valve seat 40.

As soon as the upper side of the diaphragm valve 38 is unseated from the annular valve seat 40, the pressure in the chamber 41 and control chamber 15 will act downward on the entire effective area of the upper side of this diaphragm valve 38 to quickly deflect it downward and away from the annular valve seat 40.

Fluid under pressure will now flow from the chambers 41 and 15 to atmosphere past the annular valve seat 40, and through chamber 43, choke 45, and passageway 44 at a rate determined by the diameter of choke 45.

As fluid under pressure is thus released from the chamber 15 to atmosphere, the differential fluid pressure force acting downward on the diaphragm 14 is reduced. As this differential fluid pressure force acting downward on the diaphragm 14 is reduced, the spring 33 will first unseat the lower seating surface on the disc valve 25 from the lower valve seat 27 and then shift this valve 25 and valve stem 20 upward to deflect diaphragm 14 upward until the upper seating surface on the valve 25 engages the upper valve seat 24.

When the upper seating surface on the valve 25 is thus moved into seating engagement with the upper valve seat 24, communication between the chamber 37 below diaphragm valve 38 and atmosphere is cut off.

With the upper seating surface on the valve 25 now in seating engagement with the upper valve seat 24, fluid under pressure will flow from the brake pipe 1 to the chamber 37 below the diaphragm valve 38 via second branch passageway 7, passageway 12, chamber 13, passageway 28, past valve seat 27, chamber 23, and passageway 36.

From the foregoing, it is apparent that when the pressure in the chambers 41 and 15 has reduced to a chosen value which is dependent on the strength of the spring 39, this spring 39, together with the fluid pressure force resulting from the flow of fluid under pressure from the brake pipe 1 to the chamber 37, as explained above, will shift diaphragm valve 38 upward until it engages the annular valve seat 40. It is also apparent that when the diaphragm valve 38 is thus shifted upward into engagement with the annular valve seat 40, further venting of fluid under pressure from the chambers 15 and 41 to atmosphere via the choke 45 and passageway 44 is prevented. Thus, fluid is trapped in the chambers 41 and 15 at a pressure which is less than the original pressure to which these chambers were charged from the train brake pipe via the charging choke 17.

This seating of diaphragm valve 38 on the valve seat 40 to trap fluid under pressure in the chambers 15 and 41 completes one cycle of operation of the quick service valve device 8.

If now fluid under pressure continues to be vented from the train brake to atmosphere via the engineer's brake valve device on the locomotive because the handle of this brake valve device still occupies a position in its service application zone, fluid under pressure will flow from the chamber 13 below the diaphragm 14 to atmosphere via the passageway 12, second branch pipe 7, brake pipe 1, the portion of the train brake pipe extending between the brake pipe 1 and the brake valve device on the locomotive and this brake valve device.

The choke 17 restricts the rate of flow of fluid under pressure from the control chamber 15 to the passageway 16 and thence to the brake pipe 1 via passageway 12 and second branch pipe 7.

Accordingly, a differential of pressure is again quickly developed on the opposite sides of the diaphragm 14 which acts in a downward direction. The diaphragm 14 will now be deflected downward to cause the quick service valve device 8 to complete another cycle of operation in the same manner as has been described above.

From the foregoing, it is apparent that so long as fluid under pressure is released from the train brake pipe via the engineer's brake valve device as the result of moving the handle of this valve device out of its release position and to a position in its service application zone, the quick service valve device 8 will operate in reoccurring cycles to, upon each cycle of operation, release fluid under pressure locally from the train brake pipe to atmosphere to effect a "quick service" transmission through a train brake pipe of a pressure reduction wave.

RELEASE OF A SERVICE BRAKE APPLICATION

When the engineer moves the handle of the engineer's brake valve device on the locomotive arcuately from the position it occupies in its service application zone back to its release position, fluid under pressure will no longer be vented from the train brake pipe to atmosphere via this brake valve device. This brake valve device will now supply fluid under pressure to the train brake pipe to effect a release of the brakes on all the cars in the train and the charging of the auxiliary reservoir 4 and emergency reservoir 5 on each car.

Fluid under pressure supplied to the train brake pipe will flow to the brake pipe 1 and thence to the chambers 13, 23, and 37 in the quick service valve device 8 as hereinbefore described in connection with initial charging.

Furthermore, fluid under pressure will flow to the chambers 15 and 41 via the charging choke 17 to charge these chambers 15 and 41 as well as the chambers 13, 23 and 37 to the fully charged pressure carried in the train brake pipe. Therefore, the various elements of the quick service valve device 8 will return to the position shown in FIG. 1.

DESCRIPTION—FIG. 2

Figure 2:
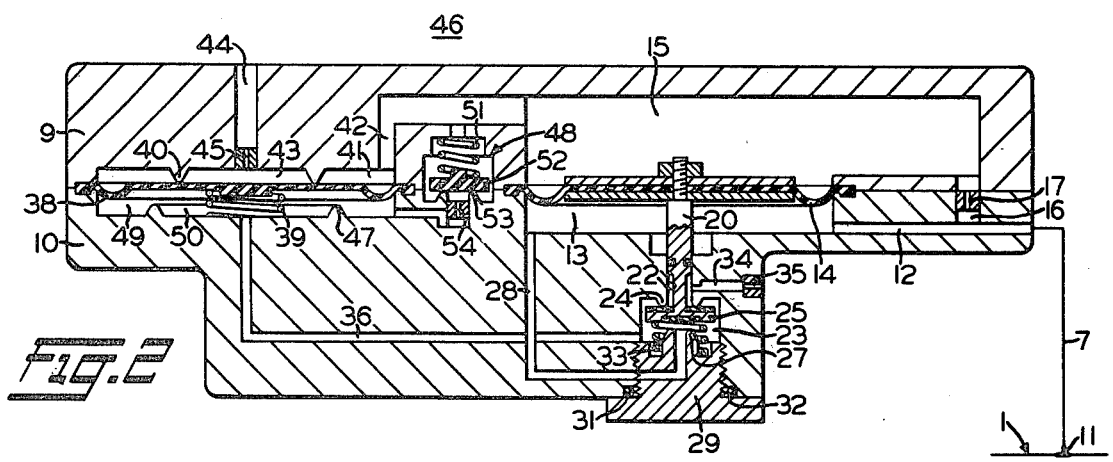
FIG. 2 is a diagrammatic view, in section, of a continual quick service valve device constructed in accordance with a second embodiment of the invention.

In FIG. 2 of the drawings, there is shown a vertical cross-sectional view of a continual quick service valve device 46 constructed in accordance with a second embodiment of the invention. According to this second embodiment of the invention, the continual quick service valve device 46 shown in FIG. 2 differs from the continual quick service valve device 8 shown in FIG. 1 in that the lower casing section 10 is provided with an annular valve seat 47, and a charging check valve device 48 enables flow of fluid under pressure from the brake pipe 1 to the control chamber 15 in addition to that provided by the charging choke 17. Accordingly, like reference numerals have been used to designate structure shown in FIG. 2 which is identical to that shown in FIG. 1. Only such features of the structure and operation of the embodiment of the invention shown in FIG. 2 which differ from that of the embodiment of FIG. 1 will be hereinafter described.

According to the embodiment of the invention disclosed in FIG. 2, the quick service valve device 46 is identical to that shown in FIG. 1 except that when fluid under pressure flows from the lower side of the diaphragm 38 to atmosphere via passageway 36, past seat 24, bore 22, passageway 34 and exhaust choke 35, the fluid under pressure present in the chamber 41, which is connected to the volume chamber 15 by the short passageway 42, will deflect the diaphragm valve 38 downward to first unseat the upper side thereof from the annular valve seat 40.

As soon as the upper side of the diaphragm valve 38 is unseated from the annular valve seat 40, the pressure in the chamber 41 and control chamber 15 will act downward on the entire effective area of the upper side of this diaphragm valve 38 to quickly deflect it downward away from the annular valve seat 40 against the yielding resistance of spring 39 and into seating contact with the annular valve seat 47 on the casing section 10 so that an annular valve chamber 49 outside of the annular valve seat 47 is sealed off from a chamber 50 within the annular valve seat 47 into which chamber 50 opens one end of the passageway 36.

As in the first embodiment of the invention, fluid under pressure will now flow from the chambers 41 and 15 to atmosphere past the annular valve seat 40, and through the chamber 43, choke 45, and passageway 44 at a rate determined by the diameter of choke 45.

As fluid under pressure is thus released from chamber 15 to atmosphere, the differential fluid pressure force acting downward on the diaphragm 14 is reduced, whereupon the spring 33 will first unseat valve 25 from the lower seat 27 and thereafter shift this valve 25 and the valve stem 20 upward to deflect the diaphragm 14 upward until the valve 25 engages the upper valve seat 24, as in the first embodiment of the invention.

When valve 25 is seated on upper valve seat 24, communication between the chamber 50 below the diaphragm valve 38 and within the annular valve seat 47 and atmosphere is cut off.

With the upper seating surface on the valve 25 now in seating engagement with the upper valve seat 24, fluid under pressure will flow from the brake pipe 1 to the chamber 50 below the diaphragm valve 38 via second branch passageway 7, passageway 12, chamber 13, passageway 28, past valve seat 27, chamber 23, and passageway 36.

From the foregoing, it is apparent that when the pressure in the chambers 41 and 15 has reduced to a chosen value which is dependent on the strength of the spring 39, this spring 39, together with the fluid pressure force resulting from the flow of fluid under pressure from the brake pipe 1 to the chamber 50, as explained above, will shift diaphragm valve 38 upward, with a snap action upon diaphragm valve 38 disengaging seat 47, until it engages the annular valve seat 40. It is also apparent that when the diaphragm valve 38 is thus shifted upward into engagement with the annular valve seat 40, further venting of fluid under pressure from the chambers 15 and 41 to atmosphere via the choke 45 and passageway 44 is prevented. Thus, fluid is trapped in the chambers 41 and 15 at a pressure which is less than the original pressure to which these chambers were charged from the train brake pipe via the charging choke 17.

Moreover, as the pressure in the chambers 41 and 15 begins to be reduced by flow to atmosphere via the choke 45, fluid under pressure will flow from the chamber 49 outside the valve seat 47 to the chamber 15 via the check valve device 48 and thence to atmosphere via this choke 45 so that the pressure in the chamber 49 is reduced simultaneously with that in the chamber 15, it being noted that the pressure in the chamber 49 exceeds that in the chamber 15 by an amount dependent on the value of a spring 51 in the check valve device 48.

It should be noted that when the diaphragm valve 38 is shifted upward from the seat 47 and into engagement with the seat 40, there will be a slight drop in the pressure of the fluid acting on the lower side of this diaphragm valve 38 as the result of equalization of the fluid under pressure in the chamber 49 flowing into the chamber 50 and passageway 36.

Furthermore, it may be noted that the spring 51 is effective to seat a disc-type valve 52 on an annular valve seat 53 to prevent back flow from the chamber 15 to the chamber 49 when the pressure in this chamber 49 is slightly reduced by equalization into the chamber 50 in the manner explained above.

As in the first embodiment of the invention, the seating of diaphragm valve 38 on the valve seat 40 to trap fluid under pressure in the chambers 15 and 41 completes one cycle of operation of the quick service valve device 46.

If now fluid under pressure continues to be vented from the train brake pipe to atmosphere via the engineer's brake valve device because the handle is still in its service application zone, fluid under pressure will flow from the chamber 13 to atmosphere via the train brake pipe and the brake valve device on the locomotive.

Since the choke 17 restricts the rate of flow of fluid under pressure from the control chamber 15 to the train brake pipe, a differential of pressure is again quickly developed which deflects the diaphragm 14 downward whereupon the quick service valve device 46 will operate in the manner described above to complete another cycle of operation.

When the engineer returns the handle of the brake valve device from the position in which it occupies in its service application zone back to its release position, fluid under pressure will be supplied by this brake valve device to the train brake pipe and, therefore, to the brake pipe 1 and thence to the chamber 13 via second branch pipe 7 and passageway 12.

Some of the fluid under pressure thus supplied to the passageway 12 flows through the passageway 16 and charging choke 17 to the chamber 15. Since the choke 17 restricts the rate of flow of fluid under pressure to the chamber 15, it is apparent that a differential fluid pressure force is quickly established on the diaphragm 14 which acts in an upward direction. Consequently, diaphragm 14 is deflected upward to shift valve stem 20 and valve 25 upward until this valve 25 engages upper seat 24.

Fluid under pressure from the brake pipe 1 will now flow to the chamber 15 via second branch pipe 7, passageway 12, chamber 13, passageway 28, past valve seat 27, chamber 23, passageway 36, chambers 50 and 49, a choke 54 and check valve device 48. The diameter of the choke 54 controls the rate of flow of fluid under pressure from the brake pipe 1 to the chamber 15 via the check valve device 48.

Moreover, fluid under pressure flows from passageway 12 to chamber 15 via passageway 16 and choke 17. Accordingly, it is apparent that fluid under pressure is supplied to the chamber 15 via the choke 17 and the check valve device 48 in parallel. Therefore, it can be seen that the provision of the check valve device 48 provides for a faster charging of the chamber 15 than is the case in the first embodiment of the invention in which chamber 15 is charged only through the choke 17.

Furthermore, the provision of the annular valve seat 47 which is engaged by the diaphragm valve 38 while in its lower position provides for a snap action of this diaphragm valve 38 when it is moved upward into engagement with valve seat 40 subsequent to its disengagement from the valve seat 47.

DESCRIPTION—FIG. 3

Figure 3:
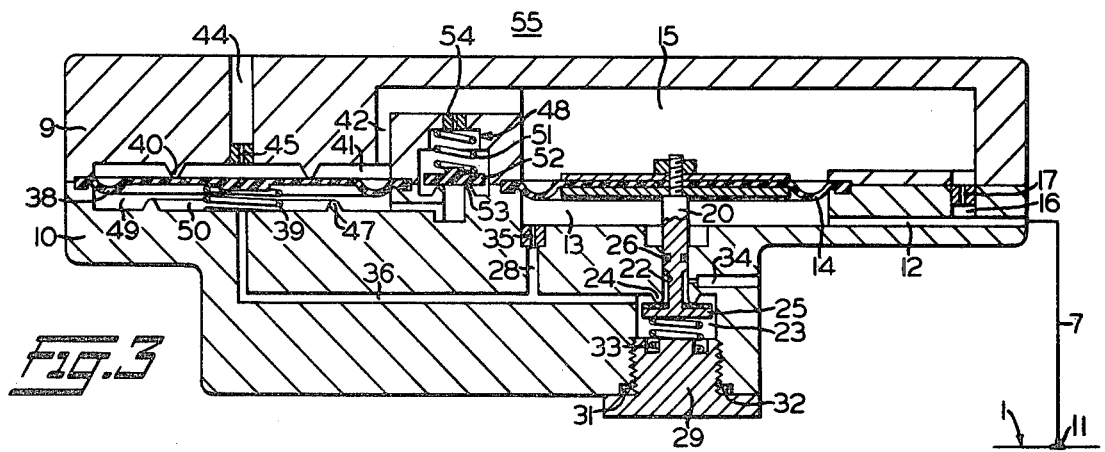
FIG. 3 is a diagrammatic view, in section, of a continual quick service valve device constructed in accordance with a third embodiment of the invention.

In FIG. 3 of the drawings, there is shown a vertical cross-sectional view of a continual quick service valve device 55 constructed in accordance with a third embodiment of the invention. According to this third embodiment of the invention, the continual quick service valve device 55 shown in FIG. 3 differs from the continual quick service valve device 46 shown in FIG. 2 in that the valve 25 is provided with only the upper valve seat 24 which necessitates that the exhaust choke 35 be placed in the passageway 28 that in this embodiment of the invention connects the chamber 13 to the passageway 36 intermediate the ends thereof. It will be noted from FIG. 3 that this passageway 36 opens at one end into the chamber 23 and at the other end into the chamber 50 the same as in the second embodiment of the invention shown in FIG. 2.

The continual quick service valve device 55 further differs from the continual quick service valve device 46 in that the choke 54 is disposed between the outlet of the check valve device 48 and the control chamber 15. Accordingly, like reference numerals have been used to designate the structure shown in FIG. 3 which is identical to that shown in FIG. 2. Only such features of the structure and operation of the embodiment of the invention shown in FIG. 3 which differ from that of the embodiment of FIG. 2 will be hereinafter described.

OPERATION—FIG. 3

Initial Charging

The control chamber 15 in the continual quick service valve device 55 shown in FIG. 3 is charged from the brake pipe 1 via the charging choke 17 and the check valve device 48 in the same manner as hereinbefore described for the continual quick service valve device 46 shown in FIG. 2.

SERVICE BRAKE APPLICATION

To manually effect a service brake application, the pressure in the train brake pipe is reduced by means of the brake valve device on the locomotive in the same manner as hereinbefore described for the first embodiment of the invention shown in FIG. 1.

As the pressure in the brake pipe 1 is reduced, the fluid under pressure will flow at an unrestricted rate from the chambers 49, 50 and 13 to the train brake pipe and thence to atmosphere via the engineer's brake valve device.

The choke 17 restricts the rate of flow of fluid under pressure from the control chamber 15 to the train brake pipe so that a differential fluid pressure force is established which deflects the diaphragm 14 downward to thereby unseat the valve 25 from the valve seat 24 against the yielding resistance of spring 33.

Upon the unseating of valve 25 from its seat 24, fluid under pressure will flow from the brake pipe 1 to atmosphere via branch pipe 7, passageway 12, chamber 13, choke 35, passageways 28 and 36, chamber 23, past valve seat 24, bore 22 and passageway 34 at a rate determined by the diameter of the choke 35.

This local venting of fluid under pressure from the brake pipe 1 to atmosphere effects a further reduction of the pressure in the chamber 13 thereby increasing the differential fluid pressure force acting downward on the diaphragm 14. Consequently, as this differential fluid pressure force acting downward on the diaphragm 14 is increased, the valve 25 will be shifted further downward from the valve seat 24 thus allowing more fluid under pressure to flow to atmosphere via the passageway 34.

Accordingly, it is apparent that the valve 25 is quickly moved down from the seat 24 far enough to allow more fluid under pressure to flow between this valve 25 and the valve seat 24 than can flow from the brake pipe 1 through the exhaust choke 35 and thence to atmosphere via passageways 28 and 36, chamber 23, past valve seat 24, bore 22 and passageway 34.

It will be noted from FIG. 3 that the chambers 49 and 50, which are connected together since the diaphragm valve 38 is unseated from the valve seat 47, are now open to atmosphere via passageway 36, chamber 23, past valve seat 24, bore 22 and passageway 34.

Consequently, it is apparent that the pressure in the chambers 49 and 50 is quickly reduced by flow to atmosphere via the pathway just described.

Upon the release of fluid under pressure from the chambers 49 and 50 to atmosphere in the manner just explained, the fluid under pressure present in the chambers 41 and 15 will deflect the diaphragm valve 38 downward to unseat it from valve seat 40 and thereafter quickly shift it downward against the yielding resistance of the spring 39 until it engages valve seat 47.

As in the previous embodiments of the invention, fluid under pressure will now be released from the chambers 41 and 15 to atmosphere.

When the pressure in the chamber 15 is reduced to substantially that in the chamber 13, the spring 33 will shift valve 25 and valve stem 20 upward to thereby deflect diaphragm 14 upward until the valve 25 is seated on seat 24 thus terminating flow of fluid under pressure from the brake pipe 1 and the chambers 49 and 50 to atmosphere.

The continued exhaust of fluid under pressure from the chambers 41 and 15 will so reduce the pressure on the upper side of diaphragm valve 38 that the spring 39 together with the fluid pressure force resulting from the pressure of brake pipe pressure in the chamber 50 will shift this diaphragm valve 38 upward into engagement with the valve seat 40 thereby terminating flow of fluid under pressure from chambers 41 and 15 to atmosphere.

Control chamber 15 will now be charged with fluid under pressure from the brake pipe 1 via the choke 17 and the check valve device 48, as in the second embodiment of the invention.

When the chamber 15 is thus charged to the pressure in the brake pipe 1, one cycle of operation of the continual quick service valve device 55 is completed.

If fluid under pressure is still being released from the train brake pipe by the engineer's brake valve device on the locomotive, the continual quick service valve device 55 will operate in repeated cycles until the pressure in the train brake pipe has been reduced to a value corresponding to the position in its service application zone to which the handle of the brake valve device was moved by the engineer and fluid under pressure is no longer released from the train brake pipe.

It will be noted that the plug 29 shown in FIG. 3 is not provided with the annular valve seat 27 shown on the plug 29 appearing in FIG. 2. It is, therefore, readily apparent that the elimination of this valve seat 27 results in a reduction in the manufacturing cost of the continual quick service valve device 55.

Having now described the invention what I claim as new and desire to secure by Letters Patent, is:

1. In a fluid pressure brake equipment, the combination of a brake pipe normally charged with fluid to a certain chosen pressure and a continual quick service valve device comprising:
 (a) a control volume;
 (b) choke means for controlling the rate of flow of fluid pressure from said brake pipe to said control volume, whereby said control volume is charged to the pressure in said brake pipe;
 (c) a piston abutment to one side of which is connected fluid pressure directly from said control volume and to the opposite side of which is connected fluid pressure from said brake pipe;
 (d) a first annular valve seat;
 (e) a valve element;
 (f) first bias means for urging said valve element toward engagement with said first valve seat, said piston abutment being operative to unseat said valve element responsive to a pressure differential thereacross whenever a reduction of said brake pipe pressure arises;
 (g) a second annular valve seat;
 (h) a diaphragm valve subject opposingly to said brake pipe and control volume pressures;
 (i) second bias means for urging said diaphragm valve toward engagement with said second valve seat;
 (j) a delivery passage via which said brake pipe pressure is connected from said opposite side of said piston abutment to said diaphragm valve to urge said diaphragm valve toward engagement with said second valve seat in concert with said second bias means;
 (k) a third annular valve seat coaxial with and spaced apart from said second annular valve seat such that said diaphragm valve is disposed therebetween for engagement with said third seat upon disengagement from said second seat;

(l) a one-way flow valve via which brake pipe pressure is connected from said delivery passage to said control volume only when said diaphragm valve is disengaged from said third valve seat; and (m) an exhaust passage connected to said delivery passage, said exhaust passage having said first valve seat arranged therewith so as to effect local venting of said brake pipe pressure when said valve element is unseated, said local venting of said brake pipe pressure effecting a pressure differential across said diaphragm valve to disengage said diaphragm valve from said second valve seat and, in turn, vent said control volume pressure via said second valve seat sufficient to counteract the pressure differential across said piston abutment.

2. A continual quick service valve device, as recited in claim 1, further characterized by restricted means for controlling flow of fluid under pressure from said one-way flow valve to said control volume.

3. A continual quick service valve device, as recited in claim 1 or claim 2, further comprising fluid flow restriction means in said delivery passage upstream of the connection of said exhaust passage therewith.

4. A continual quick service valve device, as recited in claim 1, further characterized by a first restricted means for controlling the rate of release of fluid under pressure from the brake pipe to atmosphere, and by a second restricted means for controlling flow of fluid under pressure from said one-way flow valve to said control volume, said first and second restricted means being so disposed on the respective opposite sides of said one-way flow valve as to provide for flow of fluid under pressure therethrough in series from said brake pipe to said control volume, and said first restricted means providing flow from the brake pipe to atmosphere independently of said second restricted means.

5. A continual quick service valve device, as recited in claim 4, further characterized in that said first restricted means is disposed between said third annular valve seat and said brake pipe.

* * * * *